United States Patent
Nudejima et al.

(10) Patent No.: US 12,088,774 B2
(45) Date of Patent: Sep. 10, 2024

(54) SIGNAL PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Masaki Nudejima, Kanagawa (JP); Takayuki Hashimoto, Kanagawa (JP); Daiki Takazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 418 days.

(21) Appl. No.: 17/410,340

(22) Filed: Aug. 24, 2021

(65) Prior Publication Data
US 2022/0321738 A1  Oct. 6, 2022

(30) Foreign Application Priority Data
Apr. 5, 2021 (JP) .................................. 2021-064440

(51) Int. Cl.
*H04N 1/60* (2006.01)
*H04N 1/32* (2006.01)

(52) U.S. Cl.
CPC ......... *H04N 1/603* (2013.01); *H04N 1/32491* (2013.01)

(58) Field of Classification Search
CPC ........................... H04N 1/603; H04N 1/32491
USPC ........................................................ 382/1.9
See application file for complete search history.

(56) References Cited

U.S. PATENT DOCUMENTS

| | | | | |
|---|---|---|---|---|
| 7,050,197 B1 * | 5/2006 | Szumla | ............... | H04N 1/32561 358/1.9 |
| 8,860,971 B2 * | 10/2014 | Utsunomiya | ......... | G06F 9/5094 358/1.9 |
| 10,977,763 B2 | 4/2021 | Nudejima et al. | | |
| 2009/0073467 A1 * | 3/2009 | Iida | ......................... | G06F 15/00 358/1.9 |

FOREIGN PATENT DOCUMENTS

JP        2019-81321 A        5/2019

* cited by examiner

*Primary Examiner* — Gabriel I Garcia
(74) *Attorney, Agent, or Firm* — Oliff PLC

(57) ABSTRACT

A signal processing apparatus includes first and second processors that read and execute a program, and a memory. The first processor is configured to process plural color signals at one time and output the plural color signals in parallel. The memory is configured to temporarily store the plural color signals output from the first processor. The second processor is configured to sequentially read and process plural color signals processable at one time from the memory. The first and second processors are configured to process the plural color signals in units of bands including plural lines; after completion of processing of a first band, processing of a second band starts; and the first processor is configured to start processing the second band at a time point before completion of processing of the first band by the second processor, and at which color signals of the first band remain in the memory.

20 Claims, 16 Drawing Sheets

SIGNAL PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-064440 filed Apr. 5, 2021.

BACKGROUND

(i) Technical Field

The present disclosure relates to a signal processing apparatus and a non-transitory computer readable medium.

(ii) Related Art

Japanese Unexamined Patent Application Publication No. 2019-81321 describes an information processing apparatus that prevents the occurrence of a wait time in a processing operation of a subsequent-stage processor of two processors connected in series, even in the case where the number of color signals processable at one time by the subsequent-stage processor is less than the number of color signals processable at one time by a previous-stage processor. The information processing apparatus includes the following: a first processor configured to process a plurality of color signals at one time and output the plurality of color signals in parallel; a memory configured to temporarily store the plurality of color signals output in parallel from the first processor; and a second processor configured to sequentially read and process a plurality of color signals processable at one time from the memory, the number of color signals processable by the second processor being less than the number of color signals processable by the first processor. The speed of reading from the memory is faster than the speed of writing to the memory.

By the way, in the case of processing a plurality of color signals in units of bands each including a plurality of lines, in transition from processing of one band to another by the first processor and the second processor, a time lag for the amount of a transfer unit in the memory occurs, resulting in a wait time for each band.

SUMMARY

Aspects of non-limiting embodiments of the present disclosure relate to providing technology for allowing, in the case of transferring a plurality of color signals using two processors and a memory, reduction of a wait time when the plurality of color signals are processed in units of bands, compared to a method in which processing moves from one band to the next band after processing of one band is completed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a signal processing apparatus including a first processor and a second processor that read and execute a program, and a memory. The first processor is configured to process a plurality of color signals at one time and output the plurality of color signals in parallel. The memory is configured to temporarily store the plurality of color signals output from the first processor. The second processor is configured to sequentially read and process a plurality of color signals processable at one time from the memory. The first processor and the second processor process the plurality of color signals in units of bands each including a plurality of lines. After processing of a first band is completed, processing of a second band starts. The first processor starts processing the second band at a time point which is before completion of processing of the first band by the second processor, and at which color signals of the first band remain in the memory.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment of the present disclosure will be described on the basis of the drawings by using an image forming apparatus as an example.

Firstly, the configuration of a comparative example, which serves as a premise of the present exemplary embodiment, will be described.

The image forming apparatus is an apparatus that forms an image on a recording material, and has the functions of copying, scanning, fax sending/receiving, printing, and so forth.

Figure 1:
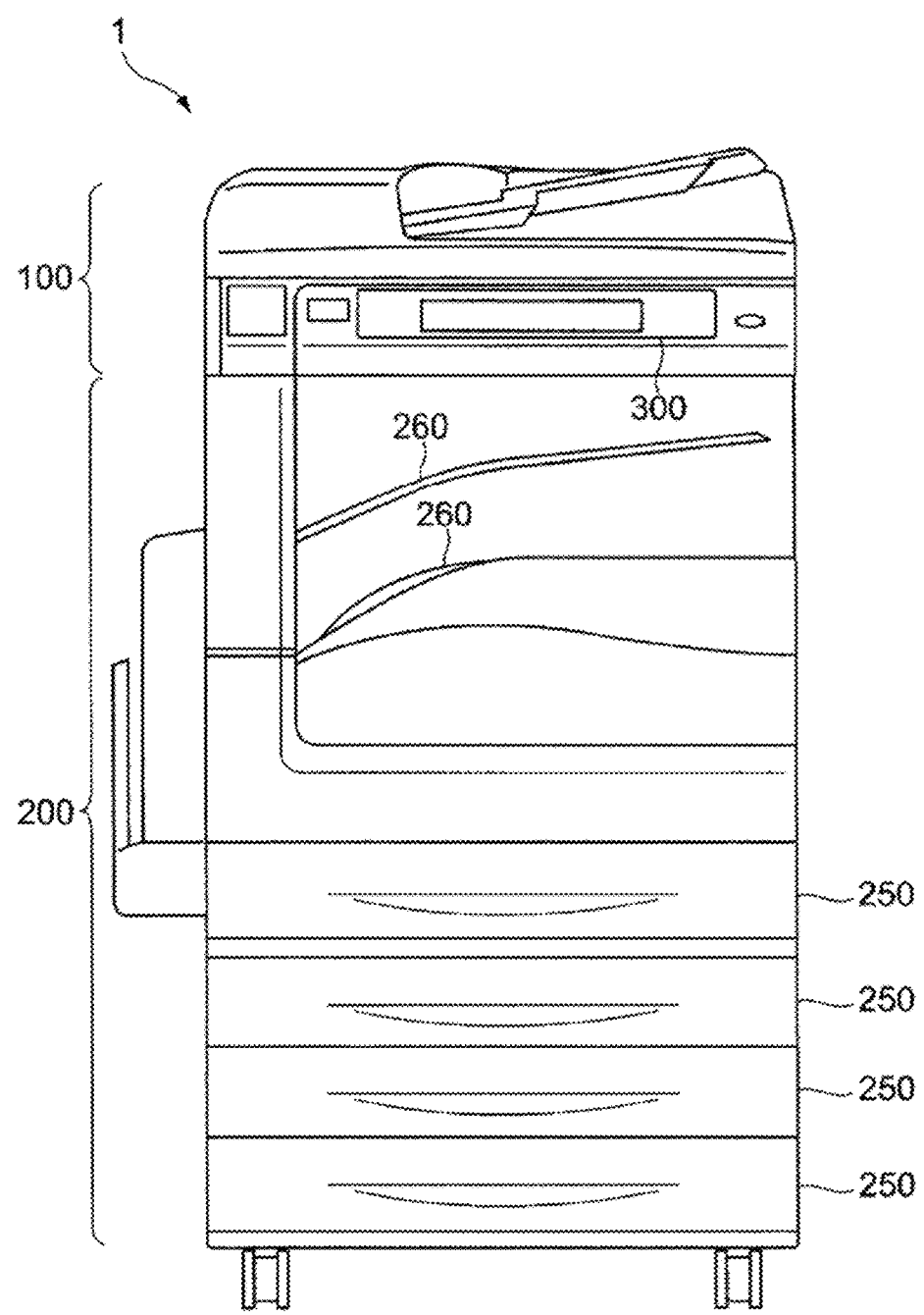
FIG. 1 is an overall illustration of an image forming apparatus.

FIG. 1 is a diagram illustrating an example of the external appearance of an image forming apparatus 1 described in, for example, Japanese Unexamined Patent Application Publication No. 2019-81321.

The image forming apparatus 1 includes an image reading device 100, which reads an image of an original, and an image recording device 200, which records an image on paper.

The image forming apparatus 1 also includes a user interface (UI) 300, which is used for receiving operations performed by a user and presenting various types of information to a user. The image forming apparatus 1 further includes a control device that controls the overall operation of the image forming apparatus 1.

The image reading device 100 is mounted on the image recording device 200, which forms the main body part of the image forming apparatus 1. The image reading device 100 includes an image reading unit 110, which optically reads an image formed on an original, and an original carrier 120, which carries an original to the image reading unit 110. The original carrier 120 includes an original accommodation section 121, which accommodates an original, and an original ejection section 122, to which the original pulled out from the original accommodation section 121 is ejected. Using a carriage mechanism, an original is carried from the original accommodation section 121 to the original ejection section 122.

The image recording device 200 includes a mechanism for forming an image on the surface of paper, a mechanism for carrying paper, and so forth.

The image recording device 200 includes an image forming unit that forms an image on paper pulled out from one of paper trays 250, a paper supply unit that supplies paper to the image forming unit, a paper ejection unit that ejects paper on which an image has been formed by the image forming unit, and a turn-over carrier that turns over the paper output from the image forming unit and carries the paper back to the image forming unit.

In the image forming unit, recording units corresponding to respective colors, i.e., yellow (Y), magenta (M), cyan (C), and black (K), are arranged along a paper carriage path.

Each of the recording units includes a photoconductor drum, a charger that charges the surface of the photoconductor drum, an exposure unit that irradiates the charged photoconductor drum with laser light to render an image, a developing unit that develops the rendered image as a toner image, and a transfer unit that transfers the toner image to a transfer belt. Toner images that are transferred to the transfer belt and that correspond to the respective colors are transferred to the surface of paper and are fused by a fusing unit.

The paper trays 250 for accommodating paper are arranged in a lower portion of the image recording device 200. Ejection trays 260 to which paper on which an image has been formed is ejected are provided in an upper portion of the image recording device 200.

A user interface 300 is arranged on the front side of the image reading device 100 so that the operating surface of the user interface 300 faces a user who operates the image forming apparatus 1.

The user interface 300 includes an operation unit that receives instructions from the user, and a display that provides information to the user. The operation unit has, for example, the function of detecting operations on hardware keys and software keys. The display displays software keys as a screen for operation.

The control device is provided inside the housing of the image recording device 200. The control device includes a central processing unit (CPU), read-only memory (ROM) storing firmware and basic input/output system (BIOS), and double-data-rate synchronous dynamic random access memory (DDR SDRAM) used as a work area for the CPU, and these units form a general computer.

The control device includes an image processor that executes various types of processing needed for forming an image (such as color correction and gradation correction). Image processing executed by the image processor includes a circuit portion that processes all the print data corresponding to the four colors, i.e., cyan (C), magenta (M), yellow (Y), and black (K), in parallel, and a circuit portion that sequentially processes the print data output from the former circuit portion one color at a time.

Figure 2:
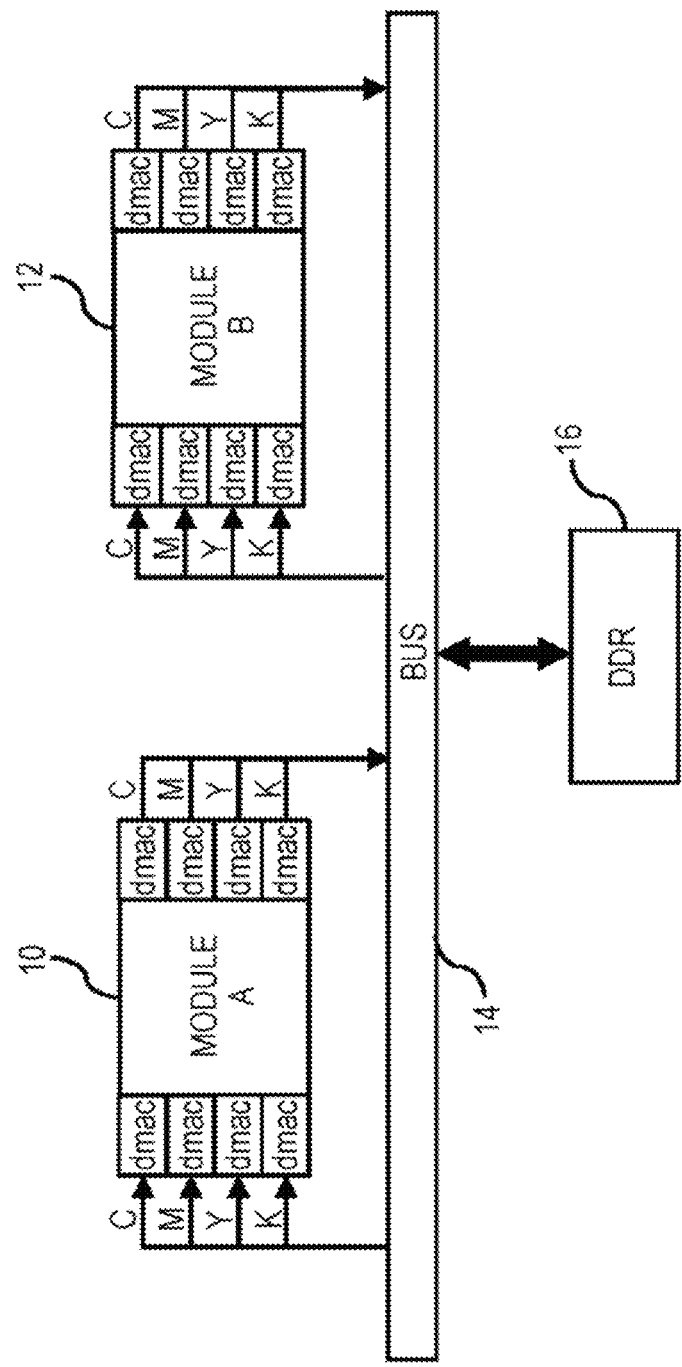
FIG. 2 is a block diagram of the configuration of an image processor of a comparative example.

FIG. 2 illustrates the configuration of an image processor of the comparative example. The image processor includes, for example, two modules, a module A10 and a module B12. These modules A10 and B12 are connected to a DDR 16 via a bus 14. The module A10 and the module B12 are both modules that simultaneously process the four CMYK colors in parallel. The module A10 and the module B12 each include direct memory access controllers (DMACs) for the four colors CMYK, which read print data of the respective colors from the DDR 16 without going through a CPU (not illustrated), and DMACs for the four CMYK colors, which write print data of the respective colors to the DDR 16 without going through the CPU. Although the module A10 and the DMACs as well as the module B12 and the DMACs are separate members in terms of functions, the module A10 and the DMACs as well as the module B12 and the DMACs will each be regarded as an integrated unit for convenience of description in the present exemplary embodiment.

Using the DMACs, the module A10 reads print data of the four CMYK colors from the DDR 16 via the bus 14, executes predetermined processing, and stores the data in the DDR 16. The module B12 reads the print data of the four CMYK colors, which has been processed by the module A10, from the DDR 16 via the bus 14, executes predetermined processing, and stores the data in the DDR 16.

The module A10 and the module B12 divide print data in units of bands, and execute processing on a band-by-band basis. Here, one band is composed of the image width×N lines (N is an integer greater than or equal to 2).

Figure 3:
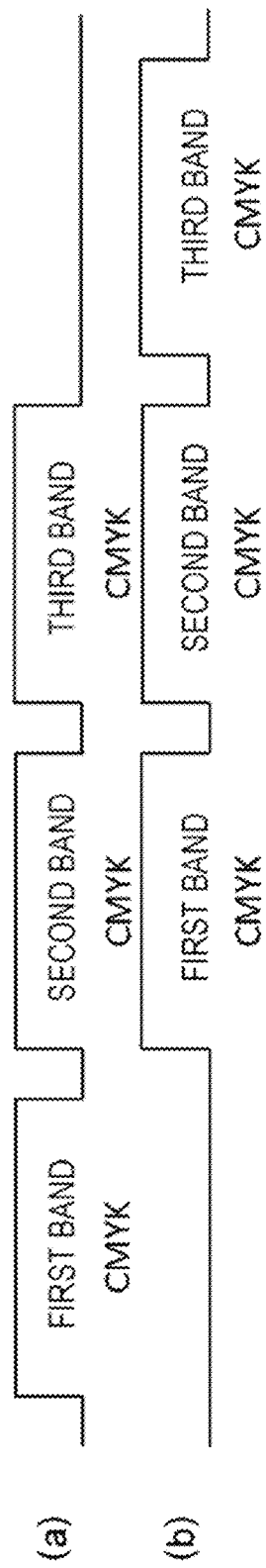
FIG. 3 is a timing chart of the comparative example illustrated in FIG. 2.

FIG. 3 illustrates a timing chart of processing of the configuration illustrated in FIG. 2. FIG. 3(*a*) is a timing chart of the module A10, and FIG. 3(*b*) is a timing chart of the module B12. It is assumed that print data is composed of a first band, a second band, and a third band. In addition, print data processed by the module A10 will be referred to as A-processed print data for convenience of description.

At first, the module A10 reads and processes print data of the four CMYK colors of the first band from the DDR 16. Next, the module B12 reads and processes the A-processed print data of the four CMYK colors of the first band from the DDR 16.

The module A10 reads and processes print data of the four CMYK colors of the next second band, in parallel to processing by the module B12 of the A-processed print data of the four CMYK colors of the first band. Then, the module B12 reads and processes the A-processed print data of the four CMYK colors of the second band from the DDR 16.

The module A10 reads and processes print data of the four CMYK colors of the next third band, in parallel to processing by the module B12 of the A-processed print data of the four CMYK colors of the second band. Then, the module B12 reads and processes the A-processed print data of the four CMYK colors of the third band from the DDR 16.

With such processing, however, the amount of transfer in reading from/writing to the DDR 16 is increased, and, because the DDR 16 becomes a bottleneck, it becomes difficult to increase the processing speed. It is thus preferable that the A-processed print data be directly transferred from the module A10 to the module B12 without going through the bus 14 and the DDR 16.

Figure 4:
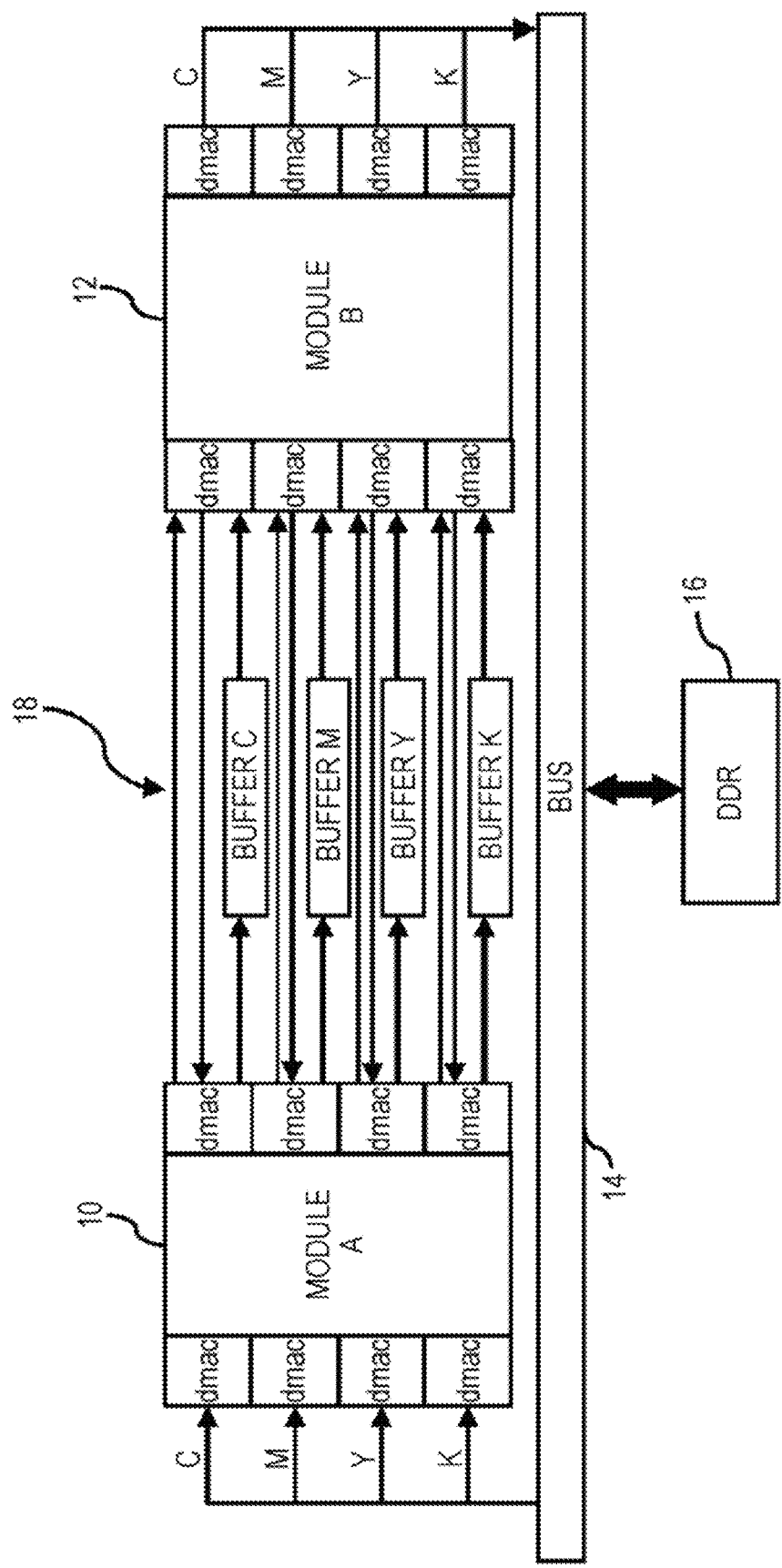
FIG. 4 is a block diagram of the configuration of an image processor of another comparative example.

FIG. 4 illustrates the configuration of an image processor of another comparative example. The configuration of the module A10 and the module B12 is the same as that in FIG. 2; however, buffer memories 18, which are capable of operating at high speed, are provided for the respective CMYK colors between the module A10 and the module B12. That is, a buffer memory for C, a buffer memory for M, a buffer memory for Y, and a buffer memory for K are provided between the module A10 and the module B12. In FIG. 4, these buffer memories for the CMYK colors are collectively referred to as the buffer memories 18.

When the module A10 processes the print data of the four CMYK colors, the DMACs temporarily store the A-processed print data in the buffer memories 18, and the DMACs of the module B12 read and process the A-processed print data from the buffer memories 18. This dispenses with transfer of print data via the DDR 16. The buffer memories 18 are ping-pong buffers or ring buffers, and the buffer memories 18 are only required to have a capacity of at least two lines for each color. The buffer memories 18 may utilize a buffer memory originally provided inside a large-scale integration (LSI) circuit, and this circuit is only required to have a capacity of about 512 MB.

Figure 5:
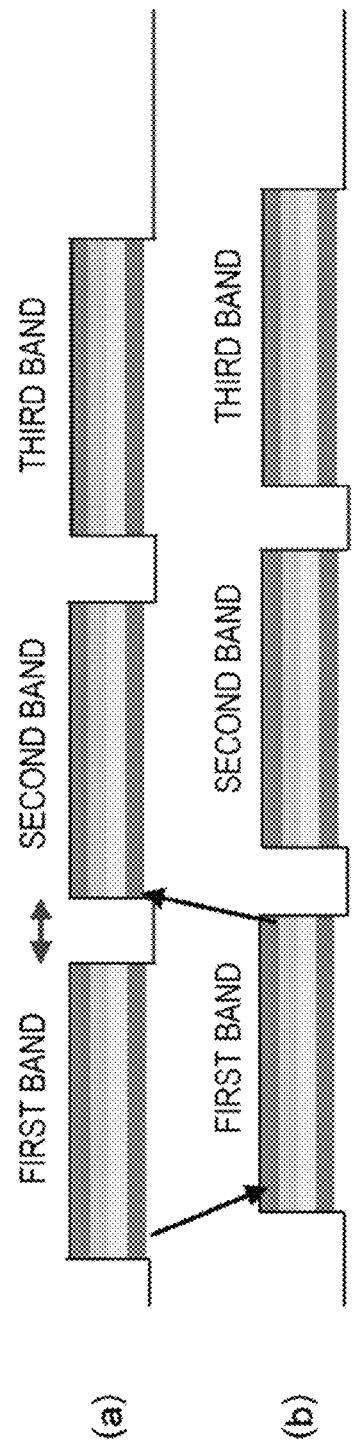
FIG. 5 is a timing chart of the comparative example illustrated in FIG. 4.

FIG. 5 illustrates a timing chart of processing of the configuration illustrated in FIG. 4. FIG. 5(*a*) is a timing chart of the module A10, and FIG. 5(*b*) is a timing chart of the module B12.

The module A10 reads and processes print data of the four CMYK colors of the first band from the DDR 16. Every time processing of print data of one line is completed, the module A10 transfers the print data to the buffer memories 18 using the DMACs.

In response to completion of processing of print data of the last line of the first band and transfer of the print data to the buffer memories 18, the module A10 waits for completion of processing by the later-stage module B12 of the A-processed print data of the first band, and, after completion of processing by the module B12, starts processing print data of the four CMYK colors of the next second band.

The module B12 sequentially reads and processes the A-processed print data of the four CMYK colors of the first band from the buffer memories 18. In response to completion of processing of A-processed print data of the last line of the first band, next, the module B12 reads and processes A-processed print data of the first line of the second band stored in the buffer memories 18.

In this manner, because the common buffer memories 18, which directly connect the module A10 and the module B12, are provided, print data may be transferred from the module A10 to the module B12 without going through the DDR 16, and the bottleneck problem of the DDR 16 may be solved.

However, because processing in the module A10 proceeds to the next second band after completion of processing of the first band and completion of processing by the module B12 of the first band, a wait time for a transfer unit (one line in this case) in the common buffer memories 18 always occurs for each band. In other words, the module A10 may start processing the next band only after the module B12 reads all the A-processed print data stored in the buffer memories 18, and the module A10 is required to wait until reading by the module B12 of A-processed print data stored in the buffer memories 18 is completed.

Although the configuration incudes two modules, the module A10 and the module B12, in FIGS. 3 to 5, the same or similar problem may occur in the configuration with more modules.

Figure 6:
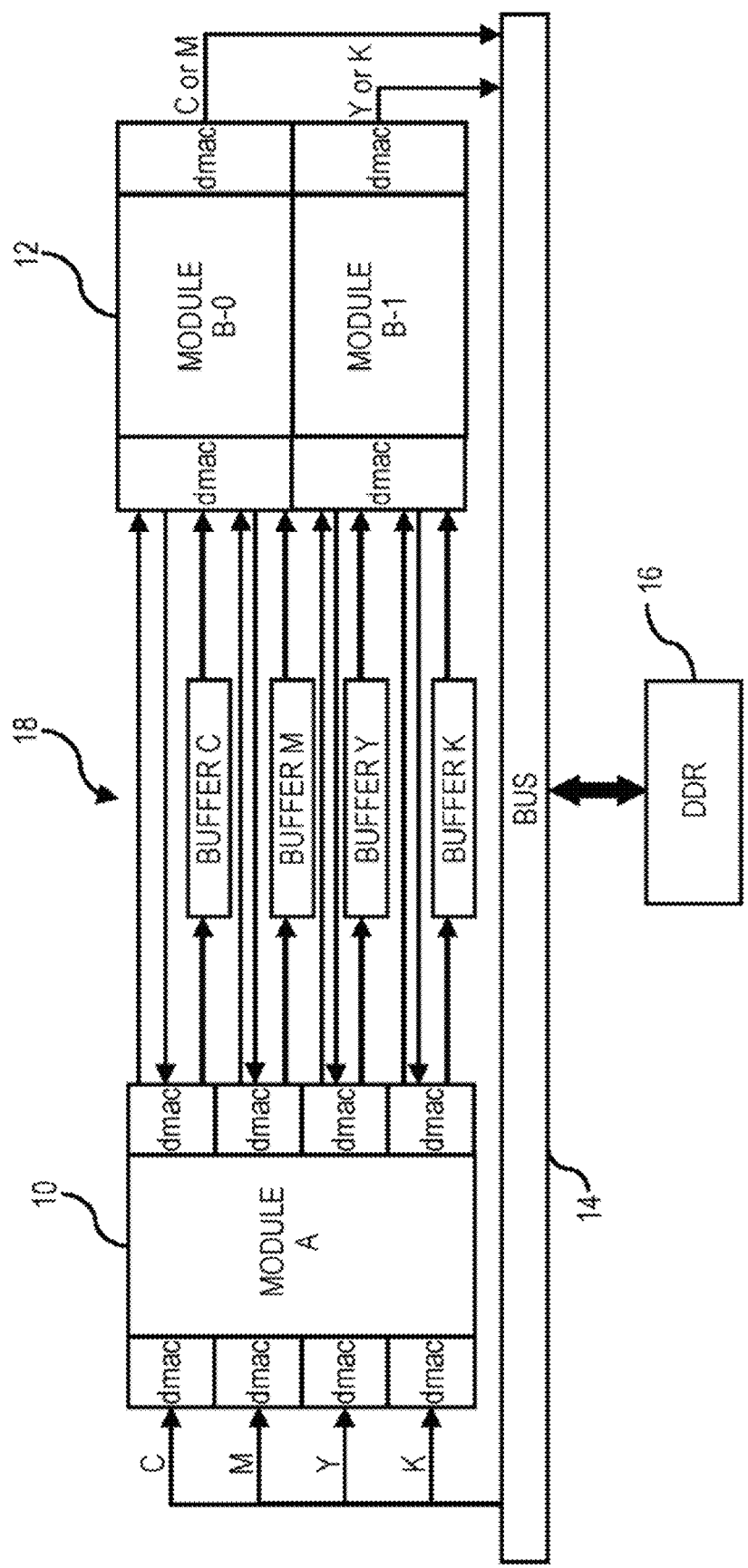
FIG. 6 is a block diagram of the configuration of an image processor of yet another comparative example.

FIG. 6 illustrates the configuration in which the module B12 is divided into two modules, a module B-0 and a module B-1, and the configuration includes three modules, the module A10, the module B-0, and the module B-1. For example, this configuration corresponds to the case where the module A10 has one core (single-core module), and the module B12 has two cores (dual-core module). The module A10 simultaneously processes the four CMYK colors in parallel, and the module B12 processes the four CMYK colors one color at a time in two steps. Specifically, the module B-0 alternatively processes C and M one color at a time, and the module B-1 alternatively processes Y and K one color a time.

Figure 7:
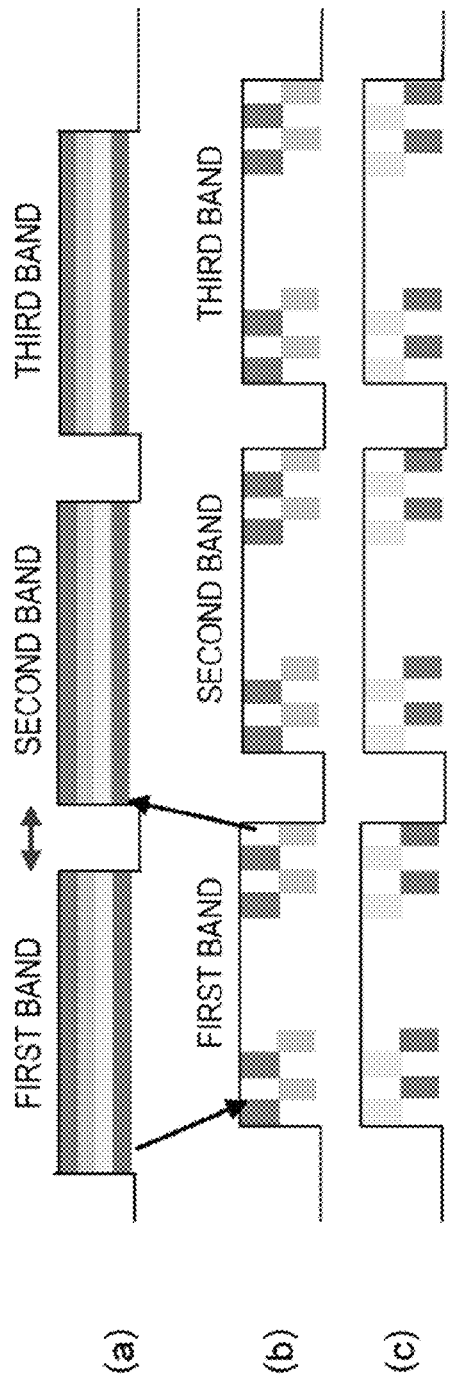
FIG. 7 is a timing chart of the comparative example illustrated in FIG. 6.

FIG. 7 illustrates a timing chart of processing of the configuration illustrated in FIG. 6. FIG. 7(*a*) is a timing chart of the module A10, FIG. 7(*b*) is a timing chart of the module B-0, and FIG. 7(*c*) is a timing chart of the module B-1.

The module A10 reads and processes print data of the four CMYK colors of the first band from the DDR 16. Every time processing of print data of one line is completed, the module A10 transfers the print data to the buffer memories 18. In response to completion of processing of print data of the last line of the first band, the module A10 waits for completion of processing by the later-stage modules B-0 and B-1 of the A-processed print data of the first band, and, after completion of processing by the modules B-0 and B-1, starts processing print data of the four CMYK colors of the next second band.

The module B-0 reads and processes the A-processed print data of C, out of the A-processed print data of the four CMYK colors of the first band, from the buffer memories 18. In response to completion of the A-processed print data of C, the module B-0 next reads and processes the A-processed print data of M from the buffer memories 18. In response to completion of the A-processed print data of M, the module B-0 again reads and processes the A-processed print data of C from the buffer memories 18. In response to completion of the A-processed print data of C, the module B-0 next and again reads and processes the A-processed print data of M from the buffer memories 18. That is, the module B-0 repeats the processing of the A-processed print data of C and M alternately.

In parallel to the processing by the module B-0, the module B-1 reads and processes the A-processed print data of Y, out of the A-processed print data of the four CMYK colors of the first band, from the buffer memories 18. In response to completion of the A-processed print data of Y, the module B-1 next reads and processes the A-processed print data of K from the buffer memories 18. In response to completion of the A-processed print data of K, the module B-1 again reads and processes the A-processed print data of Y from the buffer memories 18. In response to completion of the A-processed print data of Y, the module B-1 next and again reads and processes the A-processed print data of K from the buffer memories 18. That is, the module B-1 repeats the processing of the A-processed print data of Y and K alternately.

Also in this case, because processing in the module A10 proceeds to the next second band after completion of processing of the first band and completion of processing by the modules B-0 and B-1 of the first band, a wait time for a transfer unit (one line in this case) in the buffer memories 18 always occurs for each band.

In view of the foregoing problem of the occurrence of a wait time, in the present exemplary embodiment, the timing to write to and read from the common buffer memories 18 is adjusted, thereby further reducing a wait time occurring in the comparative example.

Next, the processing of the present exemplary embodiment will be described.

Figure 8:
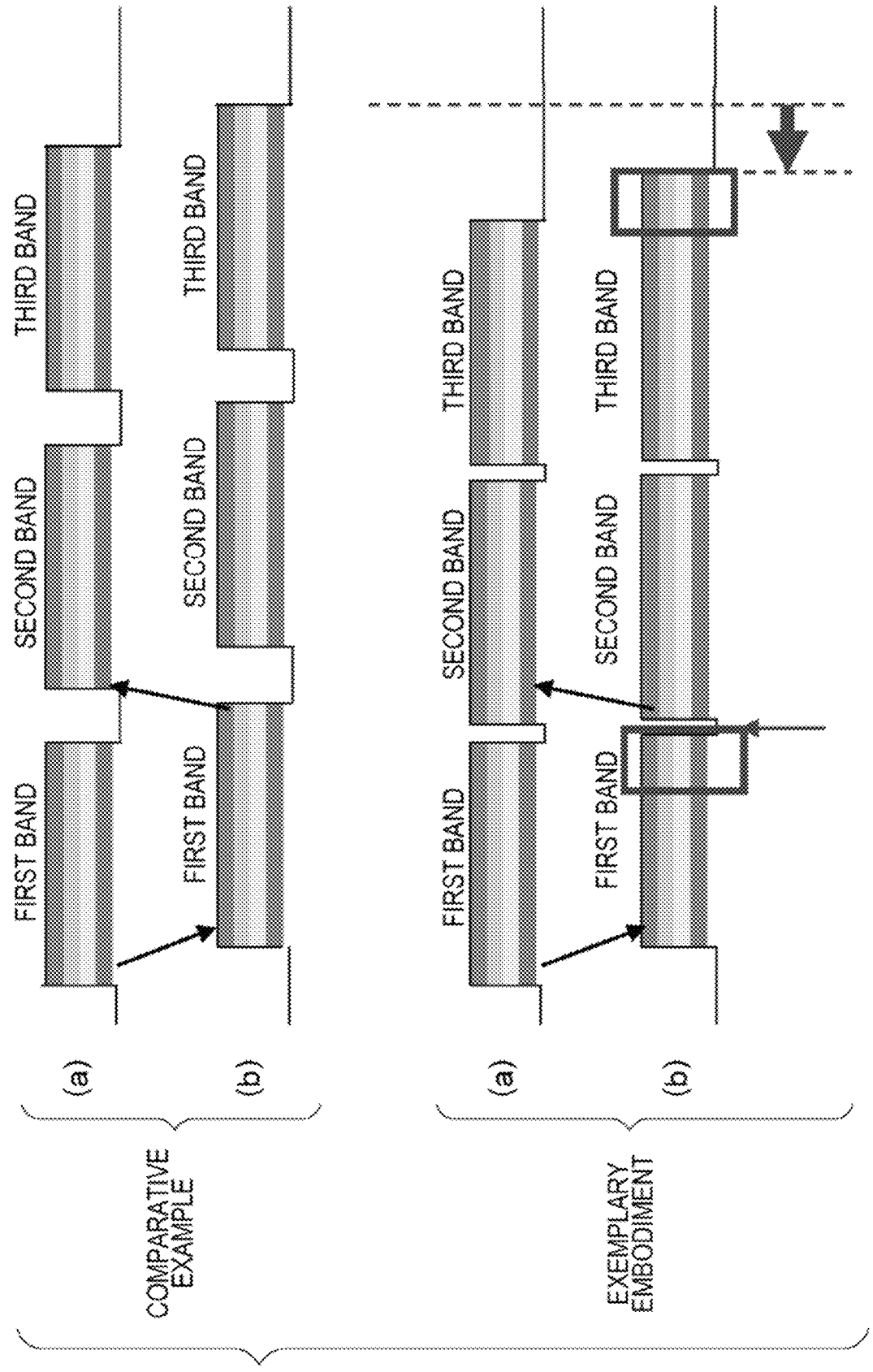
FIG. 8 is a timing chart of an image processor of an exemplary embodiment.

FIG. 8 illustrates a timing chart of the present exemplary embodiment. The configuration of the present exemplary embodiment is the same as the configuration illustrated in FIG. 4, and an image processor serving as a signal processing apparatus includes the module A10, the module B12, and the buffer memories 18 directly connecting these two modules A10 and B12. In the present exemplary embodiment, the module A10 functions as a first processor, the module B12 functions as a second processor, and the modules A10 and B12 each read and execute a program, thereby realizing various functions. Although the DMACs of the module A10 and the DMACs of the module B12 are each a dedicated controller that executes direct memory access (DMA) and are separate from a processor that executes processing of the modules A10 and B12, these are collectively referred to as processors for convenience in the present exemplary embodiment. In addition, the buffer memories 18 function as a memory. In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The upper part of FIG. 8 illustrates a timing chart of a comparative example. This is the same as the timing chart illustrated in FIG. 5. In contrast, the lower part of FIG. 8 illustrates a timing chart of the present exemplary embodiment.

In the comparative example, the module A10 starts processing the next second band after the module B12 completes processing all the lines of the first band. In the present exemplary embodiment, the module A10 starts processing the next second band before the module B12 completes processing all the lines of the first band. More specifically, in the comparative example, the module A10 starts processing the next second band after the module B12 completes processing the last line of the first band and none of the A-processed print data remains in the buffer memories 18. In the present exemplary embodiment, the module A10 starts processing the next second band in a state where there still remains the A-processed print data in the buffer memories 18, that is, in a state where print data of the last line of the first band still remains in the buffer memories 18 because the print data has not been read yet. Assuming that the first band is constituted of N lines, the module A10 starts processing in a state where the print processing of the A-processed print data of the (N−1)-th line is completed and there still remains the A-processed print data of the N-th line in the buffer memories 18.

In the timing chart in the lower part of FIG. 8, the module A10 reads and processes print data of the four CMYK colors of the first band from the DDR 16. Every time processing of print data of one line is completed, the module A10 transfers the print data to the buffer memories 18. In response to completion of processing by the module A10 of the print data of the N-th line, which is the last line, of the first band, after completion of processing by the later-stage module B12 of A-processed print data of the (N-1)-th line of the first band, the module A10 starts processing the four CMYK colors of the next second band in a state where there still remains the A-processed print data of the N-th line in the buffer memories 18. In response to completion of processing of the first line of the print data of CMYK of the second band, the module A10 writes the A-processed print data in the buffer memories 18.

Note that the writing start position is adjusted on the basis of the amount of data remaining in the buffer memories 18 so as not to overwrite the A-processed print that still remains in the buffer memories 18 and that has not yet been read by the module B12, out of the A-processed print data of the first band.

In contrast, in parallel to the above, the module B12 reads and processes the A-processed print data of the N-th line of the first band, which remains in the buffer memories 18, and, in response to completion of this processing, reads and processes the A-processed print data of the four CMYK colors of the second band at a reading start position corresponding to a writing start position specified on the basis of the amount of data remaining in the buffer memories 18. After that, the module A10 and the module B12 sequentially continue the processing in a similar manner.

With this processing, the module A10 need not wait for completion of processing by the module B12 in units of bands, and the module A10 may start processing the next band in a state where there still remains the A-processed print data in the buffer memories 18. Accordingly, a wait time for each band may be reduced, compared to the comparative example. Because a wait time for each band may be reduced in the present exemplary embodiment, this reduction effect becomes more striking as the number of bands increases.

Figure 9:
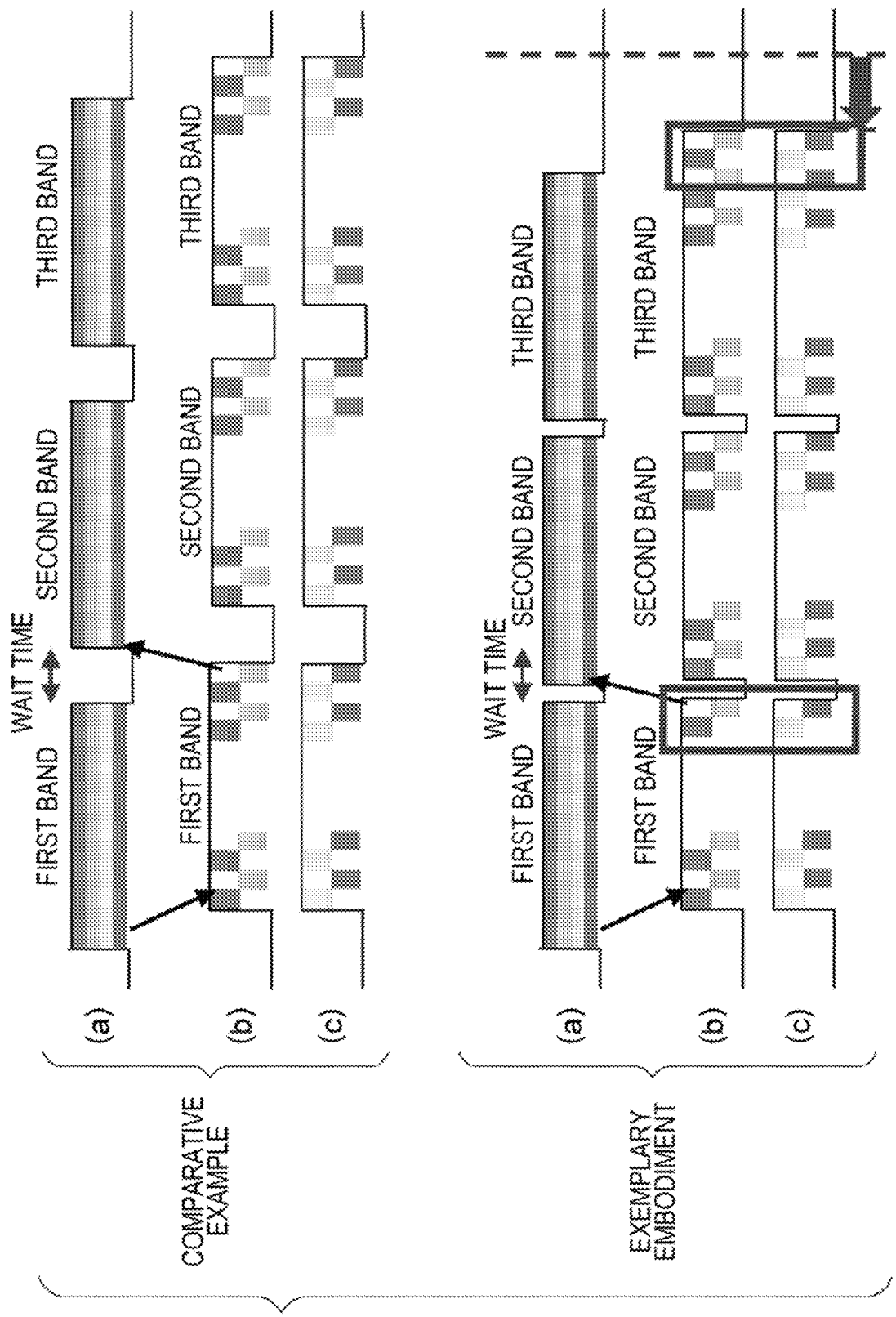
FIG. 9 is another timing chart of the image processor of the exemplary embodiment.

FIG. 9 illustrates a timing chart of another exemplary embodiment. Note that the configuration is the same as the configuration illustrated in FIG. 6, and the configuration includes the module A10, the modules B-0 and B-1, and the buffer memories 18 directly connecting these three modules A10, B-0, and B-1.

The upper part of FIG. 9 illustrates a timing chart of a comparative example. This is the same as the timing chart illustrated in FIG. 7. In contrast, the lower part of FIG. 9 illustrates a timing chart of the present exemplary embodiment.

In the comparative example, as described above, the module A10 starts processing the next second band after the modules B-0 and B-1 complete processing of all the lines of the first band. In the present exemplary embodiment, the module A10 starts processing the next second band before the modules B-0 and B-1 complete processing of all the lines of the first band. More specifically, in the comparative example, the module A10 starts processing the next second band after the modules B-0 and B-1 complete processing of the last line of the first band and none of the A-processed print data remains in the buffer memories 18. In the present exemplary embodiment, the module A10 starts processing the next second band in a state where there still remains the A-processed print data in the buffer memories 18, that is, in a state where print data of the last line of the first band still remains in the buffer memories 18. Assuming that the first band is constituted of N lines, the module A10 starts processing in a state where the print processing of the A-processed print data of the (N-1)-th line is completed and there remains the A-processed print data of the N-th line in the buffer memories 18.

In the timing chart in the lower part of FIG. 9, the module A10 reads and processes print data of the four CMYK colors of the first band from the DDR 16. Every time processing of print data of one line is completed, the module A10 transfers the print data to the buffer memories 18. In response to completion of processing of print data of the N-th line, which is the last line, of the first band, the module A10 waits for completion of processing by the later-stage modules B-0 and B-1 of the A-processed print data of the (N−1)-th line of the first band, and, after completion of processing by the modules B-0 and B-1 of the A-processed print data of the (N−1)-th line, the module A10 start processing print data of the four CMYK colors of the next second band while there still remains the A-processed print data of the N-th line in the buffer memories 18. In response to completion of processing of the first line of the print data of the four CMYK colors of the second band, the module A10 writes the A-processed print data in the buffer memories 18. At this time, the writing start position is adjusted on the basis of the amount of data remaining in the buffer memories 18 so as not to overwrite the A-processed print that still remains in the buffer memories 18 and that has not yet been read by the modules B-0 and B-1, out of the A-processed print data of the first band.

In contrast, the modules B-0 and B-1 read and process the A-processed print data of the N-th line of the first band, which remain in the buffer memories 18, and, in response to completion of this processing, read and process the A-processed print data of the four CMYK colors of the second band at a reading start position corresponding to a writing start position specified on the basis of the amount of data remaining in the buffer memories 18. After that, the module A10 and the modules B-0 and B-1 sequentially continue the processing in a similar manner.

Also with this processing, the module A10 need not wait for completion of processing by the modules B-0 and B-1 in units of bands, and the module A10 may start processing the next band in a state where there still remains the A-processed print data in the buffer memories 18. Accordingly, a wait time may be reduced, compared to the comparative example.

Writing of the A-processed print data, which has been processed by the module A10, to the buffer memories 18 and reading of the A-processed print data from the buffer memories 18 are controlled by the DMACs of each of the modules.

Figure 10:
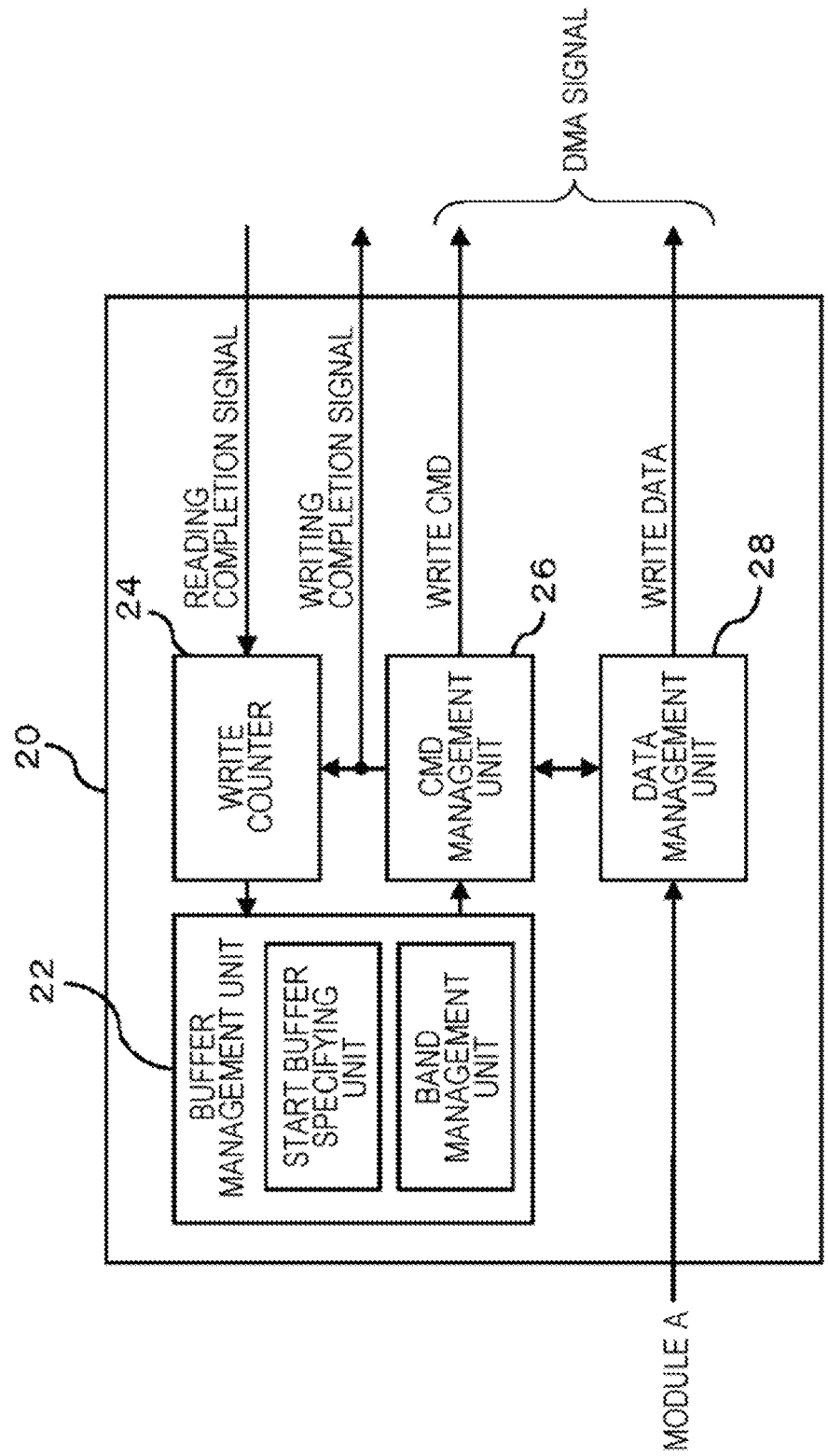
FIG. 10 is a block diagram of the configuration of Direct Memory Access Controller (DMAC) of a module A of the exemplary embodiment.

FIG. 10 illustrates the configuration of a DMAC 20 of the module A10. Although the DMAC 20 is provided for each color, the configuration of the DMAC 20 for a certain specific color (such as Y) is illustrated and described as an example. The DMAC 20 of the module A10 includes a buffer management unit 22, a write counter unit 24, a command (CMD) management unit 26, and a data management unit 28.

The buffer management unit 22 includes a start buffer specifying unit and a band management unit. The start buffer specifying unit outputs the head position of each band in two or more buffer memories 18 (in the case of ping-pong buffers) to the CMD management unit 26, and the band management unit generates a head address used by the CMD management unit 26 in accordance with the current number of bands and the current number of lines.

The write counter unit 24 sets its count value by increasing the count value in response to a notification of writing completion (output of a writing completion signal) and reducing the count value in response to a notification of reading completion (input of a reading completion signal). The initial value of the write counter unit 24 is 0. Every time a notification of writing completion is received, the count value is increased by one; every time a notification of reading completion is received, the count value is reduced by one. The write counter unit 24 manages the number of lines used in the buffer memories 18.

The CMD management unit 26 calculates the address, burst, and so forth from the specified head address and a certain image width, and issues a write command. In addition, the CMD management unit 26 outputs a notification of writing completion (writing completion signal) to the DMACs of the module B12 every time writing of the print data of one line to the buffer memories 18 is completed. On the basis of the count value of the write counter unit 24, the CMD management unit 26 controls the writing operation to the buffer memories 18.

In cooperation with the CMD management unit 26, the data management unit 28 issues the print data processed by the module A10 as to-be-written data. The write command from the CMD management unit 26 and the to-be-written data from the data management unit 28 form a DMA signal.

Figure 11:
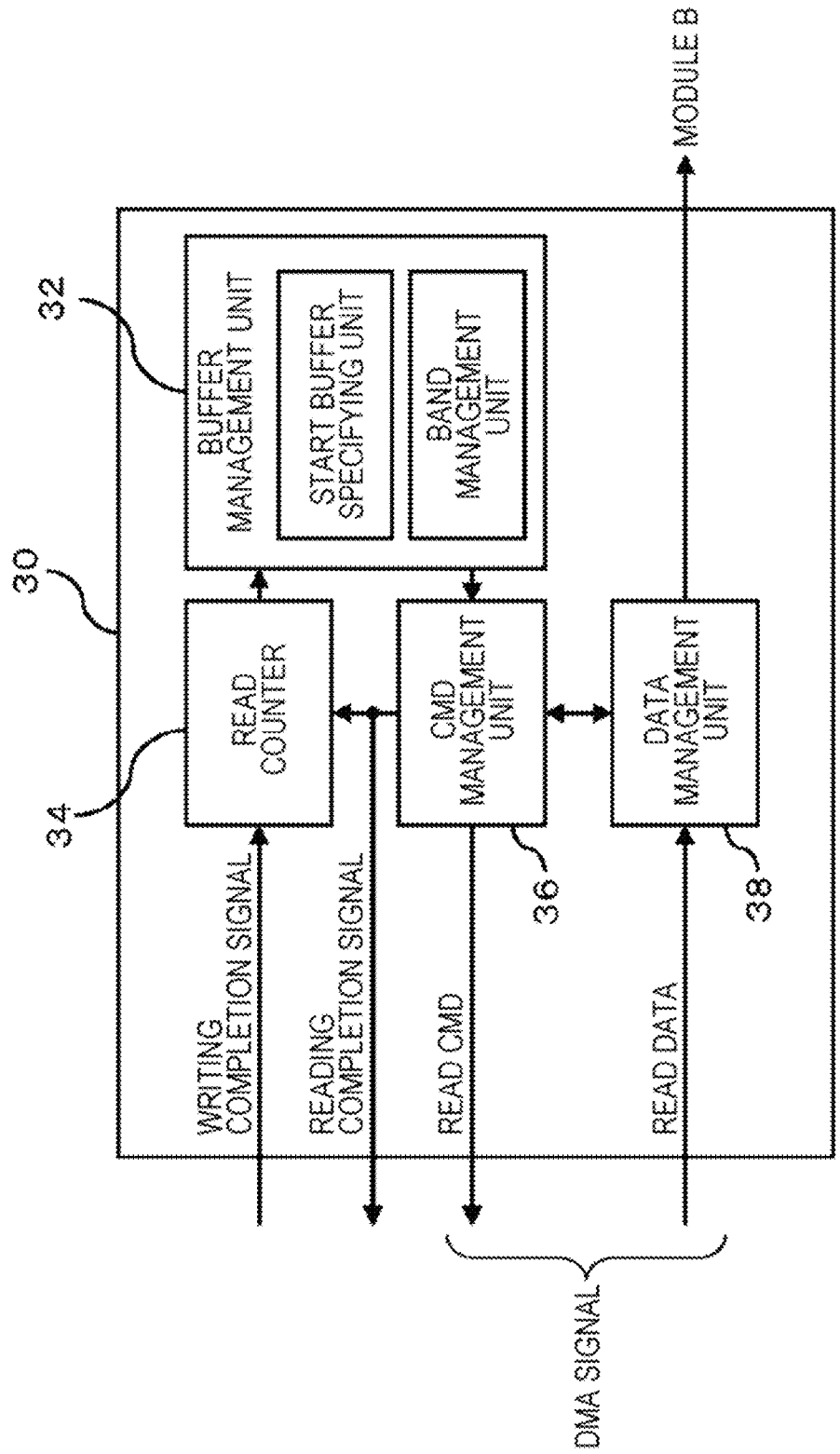
FIG. 11 is a block diagram of the configuration of a DMAC of a module B of the exemplary embodiment.

FIG. 11 illustrates the configuration of a DMAC 30 of the module B12. The DMAC 30 of the module B12 includes a buffer management unit 32, a read counter unit 34, a CMD management unit 36, and a data management unit 38.

The buffer management unit 32 includes a start buffer specifying unit and a band management unit. The buffer management unit 32 generates a head address used by the CMD management unit 36 in accordance with the current number of bands and the current number of lines.

Like the write counter unit 24, the read counter unit 34 sets its count value by increasing the count value in response to a notification of writing completion (input of a writing completion signal) and decreasing the count value in response to a notification of reading completion (output of a reading completion signal). The initial value of the read counter unit 34 is 0. Every time a notification of writing completion is received, the count value is increased by one; every time a notification of reading completion is received, the count value is reduced by one.

The CMD management unit 36 calculates the address, burst, and so forth from the specified head address and a certain image width, and issues a read command. The CMD management unit 36 outputs a notification of reading completion (reading completion signal) to the DMACs of the module A10 every time the print data of one line is read from the buffer memories 18. On the basis of the count value of the read counter unit 34, the CMD management unit 36 controls the reading operation from the buffer memories 18. Specifically, as will be described later, in the case where the count value of the read counter unit 34 is a value other than 0 (such as 1), the print data is read from the buffer memories 18; if the count value of the read counter unit 34 becomes 0, reading from the buffer memories 18 is stopped, and the state becomes standby.

The data management unit 38 outputs the A-processed print data, read from the buffer memories 18 in response to a read command, to the module B12.

Figure 12:
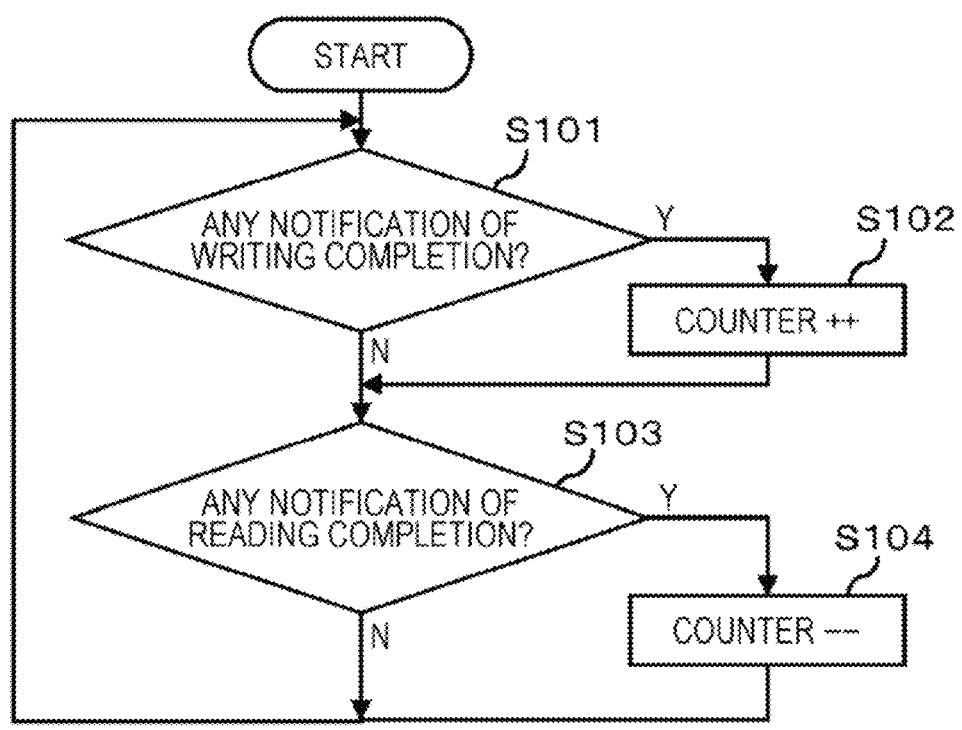
FIG. 12 is a flowchart of a process performed by a write counter unit and a read counter unit of the exemplary embodiment.

FIG. 12 is a flowchart of a process performed by the write counter unit 24 of the DMAC 20 of the module A10 and the read counter unit 34 of the DMAC 30 of the module B12.

The write counter unit 24 determines whether there is a notification of writing completion (step S101). In response to completion of processing of print data of one line, the module A10 notifies the module B12 and the write counter unit 24 of writing completion. If there is this notification of writing completion (YES in S101), the write counter unit 24 increases the count value (S102). Therefore, the count value of the write counter unit 24 remains as 0, which is the initial value, until processing of the first line of the first band is completed. When processing of the first line is completed and the print data is output to the buffer memories 18, the count value of the write counter unit 24 becomes 1, and, in response to a further notification of writing completion, the count value of the write counter unit 24 becomes 2.

If there is no notification of writing completion (NO in S101), the write counter unit 24 next determines whether there is a notification of reading completion (S103). In response to completion of reading of print data of one line from the buffer memories 18, the module B12 sends a notification of reading completion. If there is this notification of reading completion (YES in S103), the write counter unit 24 decreases the count value (S104). Therefore, in response to completion of reading of the first line in a state where the count value is 2, the count value of the write counter unit 24 changes from 2 to 1.

The same applies to the processing of the read counter unit 34. The read counter unit 34 determines whether there is a notification of writing completion (step S101). In response to completion of processing of print data of one line, the module A10 notifies the module B12 and the write counter unit 24 of writing completion. If there is this notification of writing completion (YES in S101), the write counter unit 24 increases the count value (S102). Therefore, the count value of the read counter unit 34 remains as 0, which is the initial value, until processing of the first line of the first band is completed. When processing of the first line is completed and the print data is output to the buffer memories 18, the count value of the read counter unit 34 becomes 1, and, in response to a further notification of writing completion, the count value of the read counter unit 34 becomes 2.

If there is no notification of writing completion (NO in S101), the read counter unit 34 next determines whether there is a notification of reading completion (S103). In response to completion of reading of print data of one line from the buffer memories 18, the module B12 sends a notification of reading completion. If there is this notification of reading completion (YES in S103), the read counter unit 34 decreases the count value (S104). Therefore, in response to completion of reading of the first line in a state where the count value is 2, the count value of the read counter unit 34 changes from 2 to 1.

Figure 13:
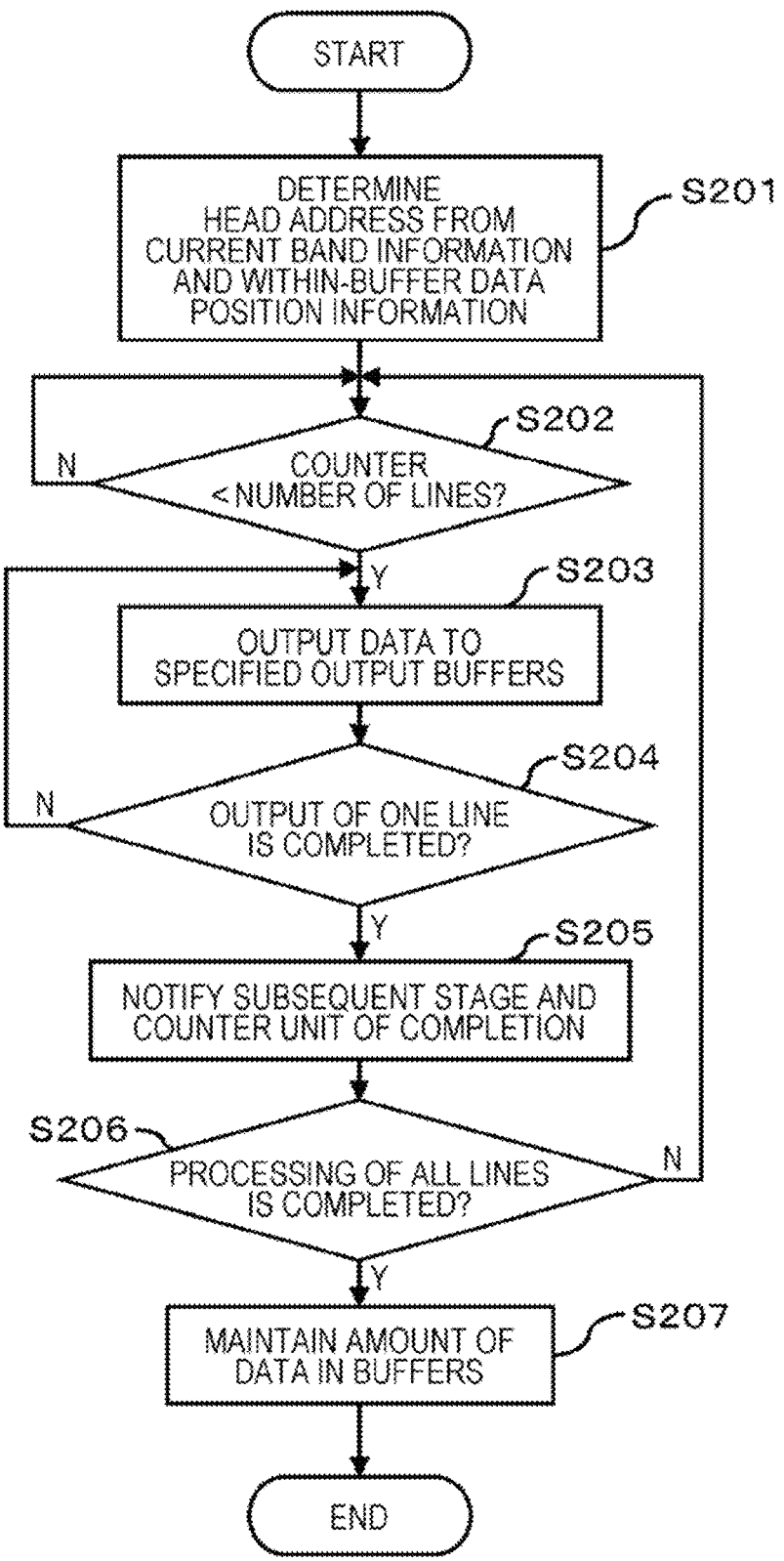
FIG. 13 is a flowchart of a process performed by the DMAC of the module A of the exemplary embodiment.

FIG. 13 is a flowchart of an overall process performed by the DMAC 20 of the module A10.

At first, the buffer management unit 22 of the DMAC 20 of the module A10 determines a head address in accordance with the current band information and within-buffer-memory data position information (S201).

Next, the CMD management unit 26 and the data management unit 28 compare the count value of the write counter unit 24 and the number of lines in the buffer memories 18 (S202), and in the case where the count value of the write counter unit 24 has not reached the number of lines in the buffer memories 18 (YES in S202), outputs the A-processed print data to specified output buffers, that is, the buffer memories 18 (S203). In the case where the count value of the write counter unit 24 has reached the number of lines in the buffer memories 18 (NO in S202), no data is output to the buffer memories 18, and the state becomes standby. It is then determined whether the A-processed print data of one line has been output (S204), and the process is repeated until the A-processed print data of one line is output to the buffer memories 18 (NO in S204).

In response to completion of output of the A-processed print data of one line to the buffer memories 18 (YES in S204), the CMD management unit 26 notifies the later stage, that is, the module B12 and the write counter unit 24, of writing completion (S205). Every time a notification of writing completion from the CMD management unit 26 is received, the write counter unit 24 increases the count value by one (see FIG. 12). Therefore, the count value of the write counter unit 24 is increased from 0 to 1 in response to output of the A-processed print data of the first line of the first band to the buffer memories 18, and furthermore, the count value of the write counter unit 24 is increased from 1 to 2 in response to output of the A-processed print data of the second line to the buffer memories 18. In addition, a notification of reading completion is sent in response to reading by the DMAC 30 of the module B12 of the A-processed print data of one line from the buffer memories 18. Every time a notification of reading completion is received, the write counter unit 24 decreases the count value by one. Therefore, on receipt of a notification of reading completion in a state where the count value is 2, the count value is decreased from 2 to 1.

The above processing is repeated for the A-processed print data of all the lines of one band (NO in S206), and, in response to completion of processing of all the lines of one band (YES in S206), the buffer management unit 22 maintains the amount of data in the buffer memories 18 (S207).

Figure 14:
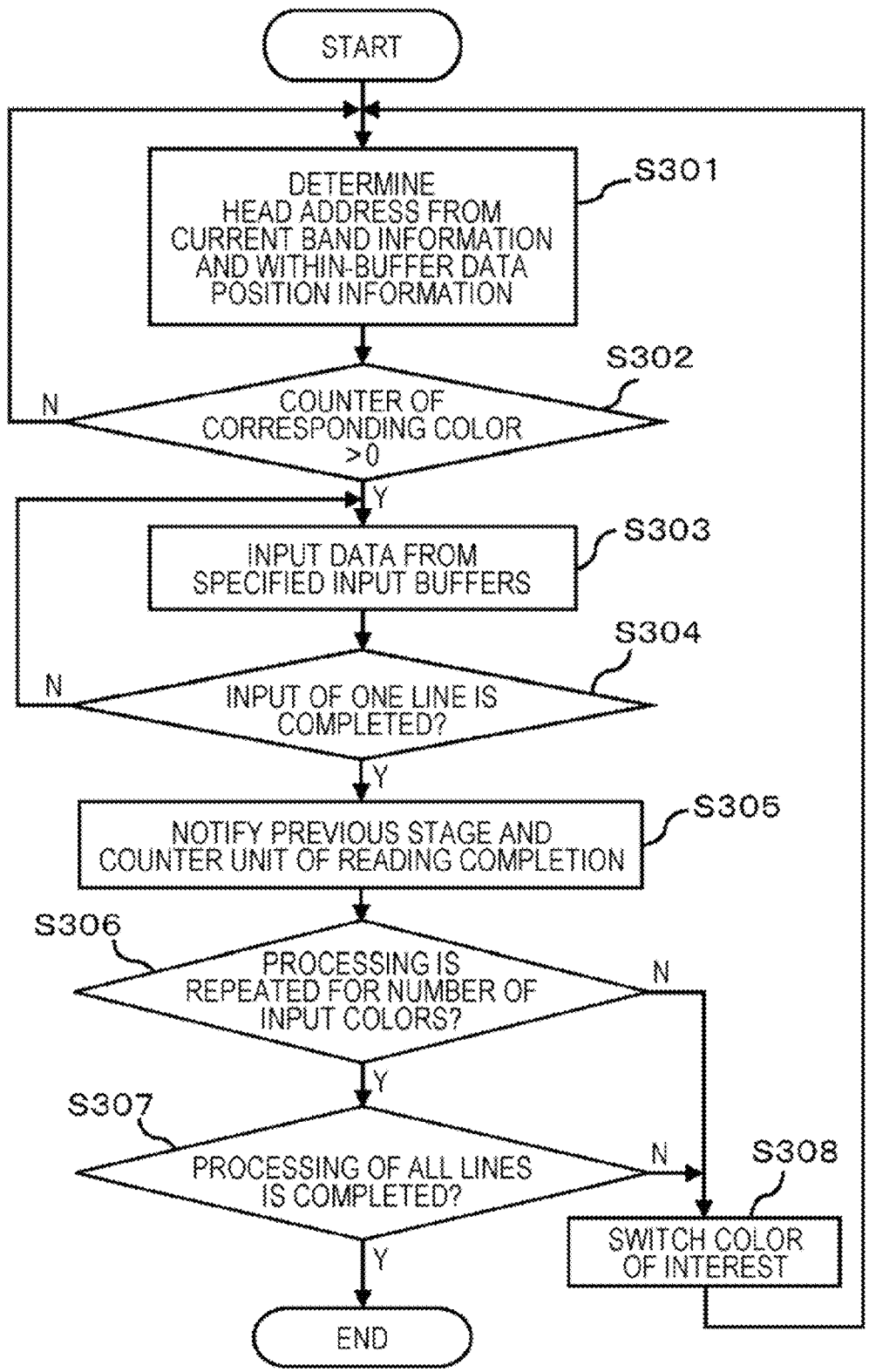
FIG. 14 is a flowchart of a process performed by the DMAC of the module B of the exemplary embodiment.

FIG. 14 is a flowchart of an overall process performed by the DMAC 30 of the module B12.

At first, the buffer management unit 32 of the DMAC 30 of the module B12 determines a head address in accordance with the current band information and within-buffer-memory data position information (S301).

Next, it is determined whether the count value of the read counter unit 34 of a corresponding color, that is, a to-be-processed color of interest, is greater than 0 (S302). The count value of the read counter unit 34 is increased by one in response to reception of a notification of writing completion, and is decreased by one in response to reception of a notification of reading completion (see FIG. 12). In the case where the count value is greater than 0, it means that the A-processed print data has been written to the buffer memories 18 and has not yet been read out. In the case where the count value is greater than 0 (YES in S302), the A-processed print data is read from the specified input buffers, that is, the buffer memories 18 (S303). It is then determined whether the print data of one line has been read (S304), and the process is repeated until the print data of one line is read (NO in S304).

In response to reading and input of the print data of one line (YES in S304), the CMD management unit 36 notifies the previous stage, that is, the module A10 and the read counter unit 34, of reading completion (S305).

After executing the above processing for the corresponding color, the color of interest is switched, and the same processing is repeated again (S308). The processing is repeated for the number of input colors (S306), and the processing is further repeated on print data of all the lines of the band (S307).

As illustrated in FIG. 4, in the case where the module B12 simultaneously processes the four CMYK colors in parallel, the corresponding color is not a specific color, but includes the four CMYK colors at the same time. It is thus always determined YES in S306, and accordingly, the color-of-interest switching processing is not executed in S308.

Figure 15:
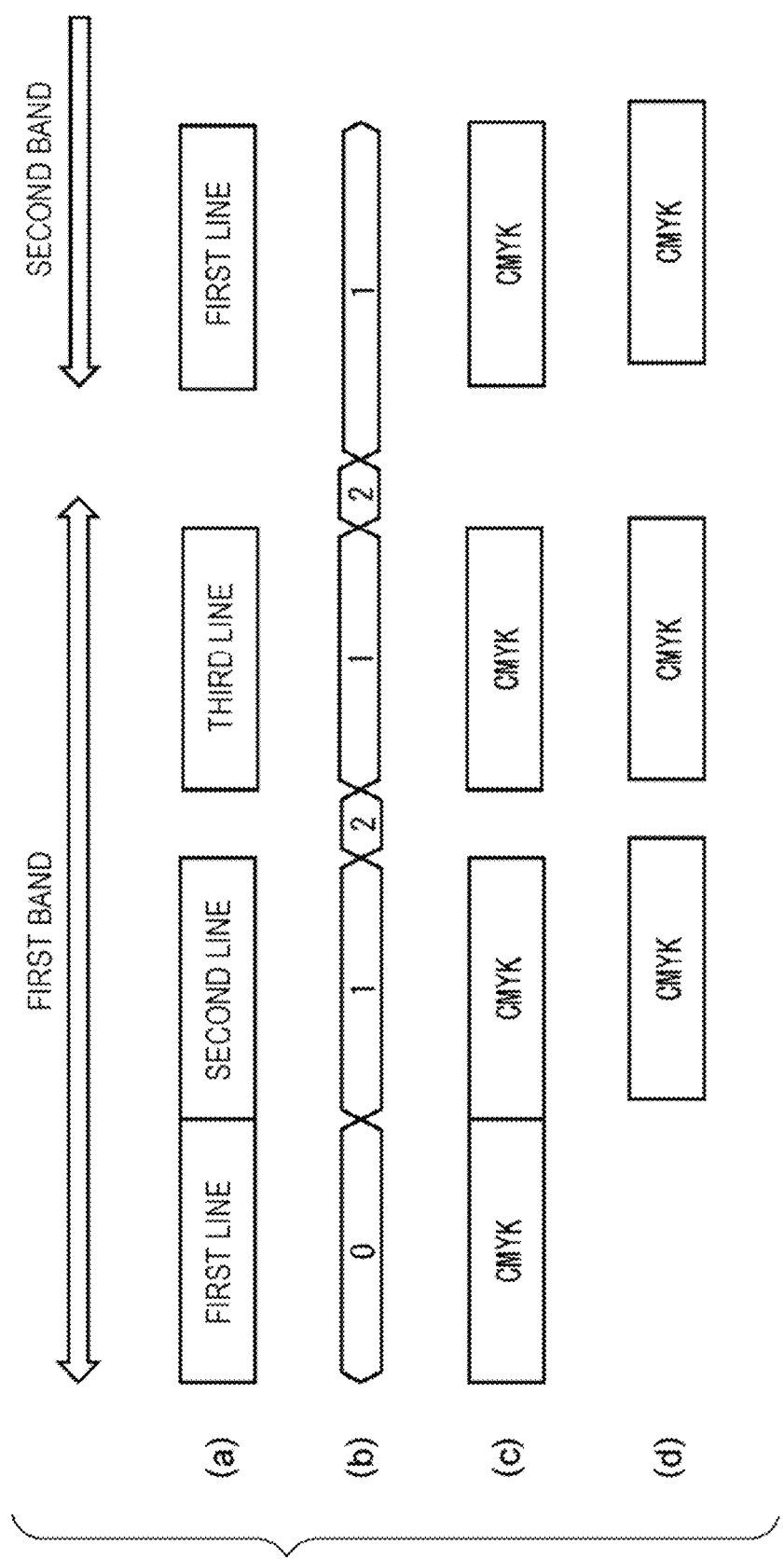
FIG. 15 is a timing chart of processing a first band and a second band of the exemplary embodiment.
Figure 16:
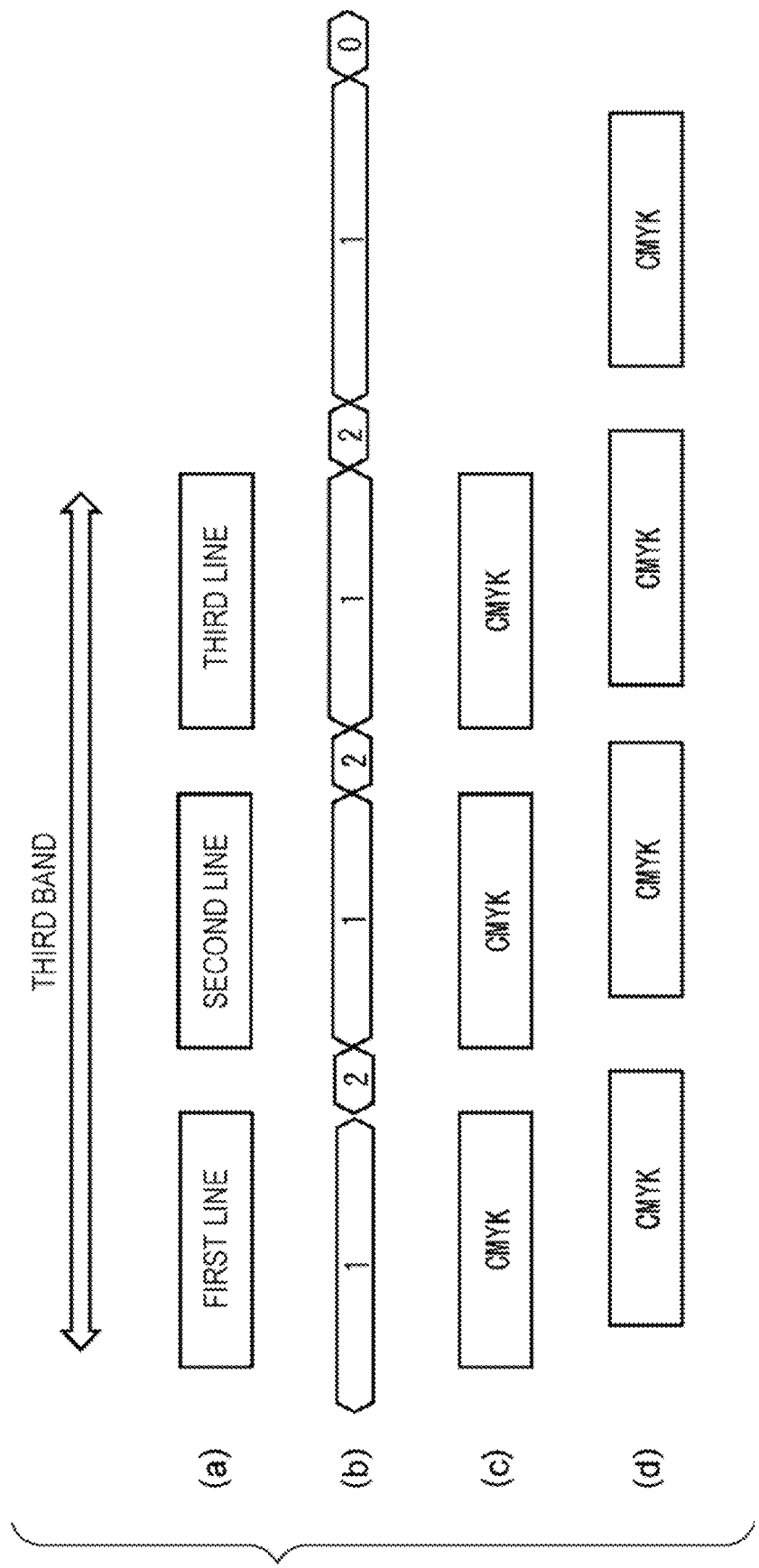
FIG. 16 is a timing chart of processing a third band of the exemplary embodiment.

FIGS. 15 and 16 each illustrate a more detailed timing chart. It is assumed that the first band to the third band are to be processed, and each band is constituted of the first line to the third line.

FIG. 15 illustrates a processing timing of the first band and the second band. FIG. 15($a$) is an output line of the module A10, FIG. 15($b$) is the count value of the write counter unit 24 of the DMAC 20 of the module A10, FIG. 15($c$) is a color processing timing of the module A10, and FIG. 15($d$) is a color processing timing of the module B12.

As the module A10 starts processing the first band, the module A10 reads print data of the first line of the first band from the DDR 16, simultaneously processes the four CMYK colors, and outputs the A-processed print data of the four CMYK colors of the first line to the buffer memories 18. At this time, the count value of the write counter unit 24 is 0, which is the initial value.

When the module A10 completes processing the print data of the first line and output of the print data of the first line to the buffer memories 18, the write counter unit 24 is notified of writing completion. Accordingly, the count value of the write counter unit 24 is increased from 0 to 1. In addition, the read counter unit 34 of the DMAC 30 of the module B12 is also notified of writing completion. Accordingly, the count value of the read counter unit 34 is increased from 0, which is the initial value, to 1.

Next, the module A10 reads print data of the second line of the first band from the DDR 16, simultaneously processes the four CMYK colors, and outputs the A-processed print data of the four CMYK colors of the second line to the buffer memories 18. At this time, the count value of the write counter unit 24 remains as 1.

In contrast, as the count value of the read counter unit 34 is increased from 0 to 1 because output of the print data of the first line is completed, the module B12 starts reading the A-processed print data of the first line from the buffer memories 18, and simultaneously processes the four CMYK colors.

When the module A10 completes processing the print data of the second line of the first band and completes output of the print data of the second line to the buffer memories 18, the write counter unit 24 and the count value of the read counter unit 34 are notified of writing completion. Accordingly, the count value of the write counter unit 24 and the count value of the read counter unit 34 are increased from 1 to 2.

In response to completion of reading by the module B12 of all the A-processed print data of the first line of the first band, the read counter unit 34 and the write counter unit 24 are notified of reading completion. Accordingly, the count value of the write counter unit 24 and the count value of the read counter unit 34 are decreased from 2 to 1. While the count value of the write counter unit 24 remains as 2, the module A10 is in a standby state without reading the print data of the next line from the DDR 16.

When reading by the module B12 of the A-processed print data of the first line is completed and the count value of the write counter unit 24 becomes 1, the module A10 reads print data of the third line of the first band from the DDR 16, simultaneously processes the four CMYK colors, and outputs the A-processed print data of the four CMYK colors of the third line to the buffer memories 18.

Due to the fact that the count value of the read counter unit 34 is 1, the module B12 starts reading the A-processed print data of the second line of the first band from the buffer memories 18, and simultaneously processes the four CMYK colors.

When the module A10 completes processing the print data of the third line of the first band and completes output of the print data of the third line to the buffer memories 18, the write counter unit 24 and the read counter unit 34 are notified of writing completion. Accordingly, the count value of the write counter unit 24 and the count value of the read counter unit 34 are again increased from 1 to 2.

In addition, in response to completion of reading by the module B12 of all the A-processed print data of the second line, the read counter unit 34 and the write counter unit 24 are notified of reading completion. Accordingly, the count value of the write counter unit 24 and the count value of the read counter unit 34 are decreased from 2 to 1.

At this time point, the module A10 has completed the simultaneous processing of the four CYMK colors of the first line to the third line of the first band, and completed the output of the data to the buffer memories 18. In contrast, the A-processed print data of the third line of the first band remains in the buffer memories 18, and the count value of the write counter unit 24 and the count value of the read counter unit 34 remain as 1.

Although the A-processed print data of one line, which has not yet read by the module B12, still remains in the buffer memories 18, the module A10 proceeds to processing of the next second band, and the module A10 reads print data of the first line of the second band from the DDR 16 and simultaneously processes the four CMYK colors.

In contrast, due to the fact that the count value of the read counter unit 34 is 1, the module B12 starts reading the A-processed print data of the third line of the first band from the buffer memories 18, and simultaneously processes the four CMYK colors. After that, the similar processing is repeated. FIG. 16 illustrates a processing timing of the last third band.

Like the first band and the second band, the module A10 and the module B12 sequentially process the print data of the first line to the third line.

When the module A10 completes reading of print data of the third line from the DDR 16, simultaneous processing of the four CMYK colors, and output of the print data to the buffer memories 18, the write counter unit 24 and the read counter unit 34 are notified of writing completion. Accordingly, the count value of the write counter unit 24 and the count value of the read counter unit 34 are increased from 1 to 2.

The module B12 reads the A-processed print data of the second line of the third band from the buffer memories 18, and simultaneously processes the four CMYK colors. In response to reading of all the A-processed print data of the second line of the third band, the read counter unit 34 and the write counter unit 24 are notified of reading completion. Accordingly, the count value of the write counter unit 24 and the count value of the read counter unit 34 are decreased from 2 to 1.

After that, the module A10 enters a standby state because the module A10 has completed all the processing of print data of the first line to the third line of the third band. As for the module B12, because the count value of the read counter unit 34 remains as 1 even after all the processing of the second line of the third band is completed, the module B12 accordingly reads the A-processed print data of the third line from the buffer memories 18 and simultaneously processes the four CMYK colors. After reading all the A-processed print data of the third line, the module B12 notifies the read counter unit 34 and the write counter unit 24 of reading completion. Accordingly, the count value of the write counter unit 24 and the count value of the read counter unit 34 are decreased from 1 to 0, and the entire process ends.

It shall be noted that, as illustrated in FIG. 16(d), after the module B12 reads all the A-processed print data of the second line, the module B12 continuously reads and processes the A-processed print data of the third line, which remains in the buffer memories 18.

Although the case in which the module A10 and the module B12 process the four CMYK colors simultaneously is illustrated by way of example in FIGS. 15 and 16, as illustrated in FIG. 6, the same applies to the case in which the module B12 includes the modules B-0 and B-1, and the module B-0 alternately processes C and M one color at a time while the module B-0 alternately processes Y and K one color at a time. In this case, it is only necessary to provide the write counter unit 24 and the read counter unit 34 for each color and to increase or decrease the count values.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A signal processing apparatus comprising:
a first processor and a second processor that read and execute a program; and
a memory, wherein:
the first processor is configured to process a plurality of color signals at one time and output the plurality of color signals in parallel,
the memory is configured to temporarily store the plurality of color signals output from the first processor,
the second processor is configured to sequentially read and process a plurality of color signals processable at one time from the memory, and
the first processor and the second processor are configured to process the plurality of color signals in units of bands each including a plurality of lines; after completion of processing of a first band, processing of a next second band starts; and the first processor is configured to start processing the second band at a time point which is before completion of processing of the first band by the second processor, and at which color signals of the first band remain in the memory.

2. The signal processing apparatus according to claim 1, wherein the first processor is configured to start processing the second band before the second processor reads color signals of a last line of the first band from the memory.

3. The signal processing apparatus according to claim 2, wherein:
the first processor is configured to notify the second processor of completion of writing after writing color signals of one line included in the first band to the memory, and
the second processor is configured to, after receipt of the notification of completion of writing, read the color signals processed by the first processor from the memory and notify the first processor of completion of reading.

4. The signal processing apparatus according to claim 3, wherein:
the first processor is configured to notify the second processor of completion of writing after writing color signals of a last line included in the first band to the memory,
the second processor is configured to, after receipt of the notification of completion of writing from the first processor, read color signals of one line prior to the last line from the memory, and notify the first processor of completion of reading, and
the first processor is configured to, after receipt of the notification of completion of reading from the second processor, process color signals of a first line included in the second band, and write the color signals to the memory without overwriting the color signals of the last line.

5. The signal processing apparatus according to claim 4, wherein, after the first processor writes the color signals of the first line included in the second band to the memory without overwriting the color signals of the last line, and after receipt of a notification of completion of writing, the second processor is configured to read the color signals of the last line from the memory.

6. The signal processing apparatus according to claim 5, wherein:
the first processor is configured to notify the second processor of completion of writing after writing color signals of a last line included in a last band included in a page to the memory, and
the second processor is configured to, after receipt of the notification of completion of writing from the first processor, read color signals of one line prior to the last line of the last band from the memory, further read the color signals of the last line of the last band from the memory, and notify the first processor of completion of reading.

7. The signal processing apparatus according to claim 5, wherein the second processor is provided in plurality, and each of the second processors is configured to read and process a different color signal among the plurality of color signals from the memory.

8. The signal processing apparatus according to claim 4, wherein:
the first processor is configured to notify the second processor of completion of writing after writing color signals of a last line included in a last band included in a page to the memory, and
the second processor is configured to, after receipt of the notification of completion of writing from the first processor, read color signals of one line prior to the last line of the last band from the memory, further read the color signals of the last line of the last band from the memory, and notify the first processor of completion of reading.

9. The signal processing apparatus according to claim 8, wherein the second processor is provided in plurality, and each of the second processors is configured to read and process a different color signal among the plurality of color signals from the memory.

10. The signal processing apparatus according to claim 4, wherein the second processor is provided in plurality, and each of the second processors is configured to read and process a different color signal among the plurality of color signals from the memory.

11. The signal processing apparatus according to claim 3, wherein:
the first processor is configured to notify the second processor of completion of writing after writing color signals of a last line included in a last band included in a page to the memory, and
the second processor is configured to, after receipt of the notification of completion of writing from the first processor, read color signals of one line prior to the last line of the last band from the memory, further read the color signals of the last line of the last band from the memory, and notify the first processor of completion of reading.

12. The signal processing apparatus according to claim 11, wherein the second processor is provided in plurality, and each of the second processors is configured to read and process a different color signal among the plurality of color signals from the memory.

13. The signal processing apparatus according to claim 3, wherein the second processor is provided in plurality, and each of the second processors is configured to read and process a different color signal among the plurality of color signals from the memory.

14. The signal processing apparatus according to claim 2, wherein:
the first processor is configured to notify the second processor of completion of writing after writing color signals of a last line included in a last band included in a page to the memory, and
the second processor is configured to, after receipt of the notification of completion of writing from the first processor, read color signals of one line prior to the last line of the last band from the memory, further read the color signals of the last line of the last band from the memory, and notify the first processor of completion of reading.

15. The signal processing apparatus according to claim 14, wherein the second processor is provided in plurality, and each of the second processors is configured to read and process a different color signal among the plurality of color signals from the memory.

16. The signal processing apparatus according to claim 2, wherein the second processor is provided in plurality, and each of the second processors is configured to read and process a different color signal among the plurality of color signals from the memory.

17. The signal processing apparatus according to claim 1, wherein:
the first processor is configured to notify the second processor of completion of writing after writing color signals of a last line included in a last band included in a page to the memory, and
the second processor is configured to, after receipt of the notification of completion of writing from the first processor, read color signals of one line prior to the last line of the last band from the memory, further read the color signals of the last line of the last band from the memory, and notify the first processor of completion of reading.

18. The signal processing apparatus according to claim 17, wherein the second processor is provided in plurality, and each of the second processors is configured to read and process a different color signal among the plurality of color signals from the memory.

19. The signal processing apparatus according to claim 1, wherein the second processor is provided in plurality, and each of the second processors is configured to read and process a different color signal among the plurality of color signals from the memory.

20. A non-transitory computer readable medium storing a program causing a processor to function as:
a first processor that processes a plurality of color signals at one time and outputs the plurality of color signals in parallel; and
a second processor that sequentially reads and processes a plurality of color signals processable at one time from a storage device that temporarily stores the plurality of color signals output from the first processor, wherein:
the first processor and the second processor process the plurality of color signals in units of bands each including a plurality of lines; after completion of processing of a first band, processing of a next second band starts; and the first processor starts processing the second band at a time point which is before completion of processing of the first band by the second processor, and at which color signals of the first band remain in the storage device.

* * * * *